United States Patent [19]
Penneck et al.

[11] Patent Number: 4,809,244
[45] Date of Patent: Feb. 28, 1989

[54] SUPPORT MEMBER FOR PRESSURE SENSOR

[75] Inventors: Richard J. Penneck, Lechlade; David R. Fox, Swindon; Edward B. Atkinson, Ipswich, all of England

[73] Assignee: Focas Limited, United Kingdom

[21] Appl. No.: 90,265

[22] Filed: Aug. 3, 1987

[30] Foreign Application Priority Data

Dec. 5, 1985 [GB] United Kingdom ............... 8529975

[51] Int. Cl.[4] ...................... H04R 17/00; H01L 41/00
[52] U.S. Cl. .................... 367/162; 367/159; 367/169; 367/176; 310/337; 310/338; 310/345
[58] Field of Search .............. 310/337, 800, 338, 340, 310/345, 348, 357.1; 367/155, 157, 159, 160, 161, 162, 165, 167, 169, 170, 172, 173, 176; 181/198, 207, 208; 264/272.11, 272.12, 272.14, 272.16; 174/705, 101.5, 110 AR, 110 SR, 110 SY, DIG. 12

[56] References Cited

U.S. PATENT DOCUMENTS

| H391 | 12/1987 | Henriquez et al. | 367/169 X |
|---|---|---|---|
| 3,775,737 | 11/1973 | Laurent | 367/159 |
| 3,798,474 | 3/1974 | Cassand | 310/800 |
| 4,056,742 | 11/1977 | Tibbetts | 310/800 |
| 4,166,229 | 8/1979 | DeReggi et al. | 310/800 |
| 4,300,219 | 11/1981 | Joyal | 367/174 |
| 4,322,877 | 4/1982 | Taylor | 29/25.35 |
| 4,409,681 | 10/1983 | White | 367/159 X |
| 4,629,925 | 12/1986 | Booth | 310/330 |

FOREIGN PATENT DOCUMENTS 2042256 9/1980 United Kingdom ............... 310/800

OTHER PUBLICATIONS

Powers, Piezoelectric Polymer—An Emerging Hydrophone Technology, IEEE Electronics and Aerospace Convention 1979, Part III, pp. 517–523.
Pantellis, Physics in Technology 15(5), Sep. 1984, pp. 239–243 and 261.
Pantellis, American Chemical Society Symposium Series 1984, pp. 399 et seq.
Klaase and van Turnhout, IEE Conf. Publ. No. 177, 1979.
Nix, Holt, McGrath and Ward, Ferroelectrics, 1981, vol. 32, pp. 103–114.

Primary Examiner—Brian S. Steinberger
Attorney, Agent, or Firm—Kinney & Lange

[57] ABSTRACT

A support for an elongated piezoelectric pressure sensor, which is general cylindrical in shape is mounted on a hollow support member that has a thickness and strength selected to meet desired conditions. The elongated piezoelectric pressure sensor is wound in a helical depression on the exterior of the support member, and the support member in turn is filled with a potting material having a bulk modulus of elasticity selected to provide a sufficient flexibility so that the elongated piezoelectric sensing element generates signals that have a desired sign characteristic and improved acoustic response.

16 Claims, 2 Drawing Sheets

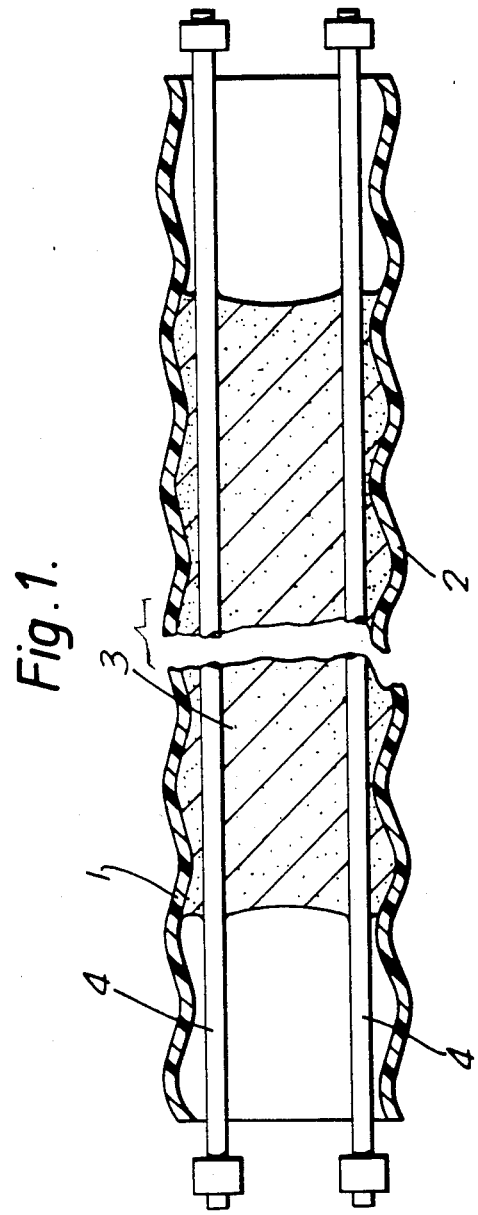

U.S. Patent Feb. 28, 1989 Sheet 2 of 2 4,809,244
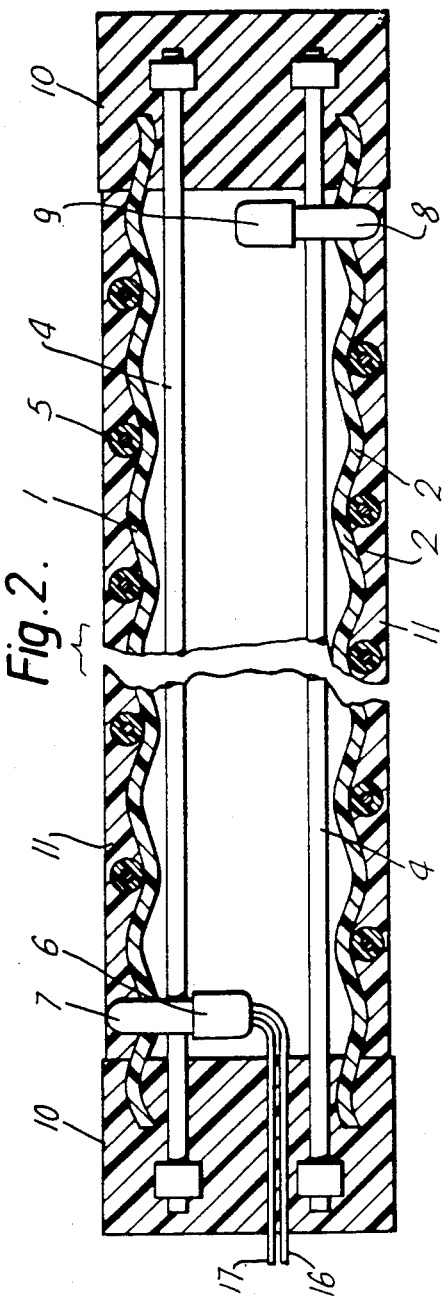
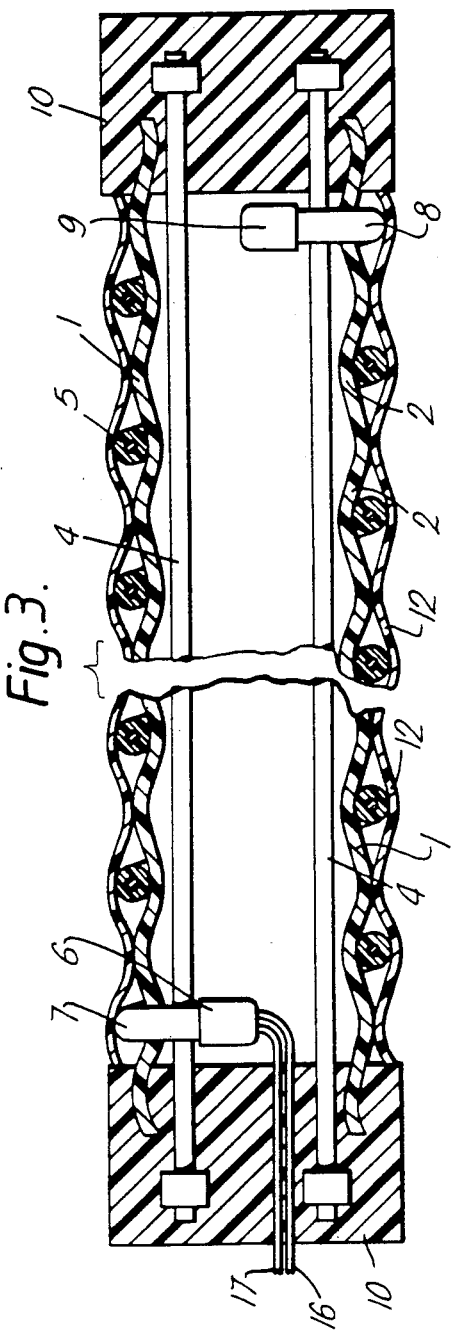

SUPPORT MEMBER FOR PRESSURE SENSOR

This invention relates to pressure transducers and especially to acoustic transducers.

It has been proposed to form transducers for detecting very low amplitude pressure variations out of piezoelectric materials, and recently from piezoelectric polymeric materials, for example as described in U.S. Pat. No. 3,798,474. The use of piezoelectric polymeric materials has a number of advantages over the use of piezoceramics, for example extended piezoelectric elements can be formed which provide a large area for receiving acoustic signals. In addition, polymeric piezoelectric devices are inherently more flexible than piezoceramic devices, the increase in flexibility providing a number of benefits including reduced risk of catastrophic failure when subjected to excessive pressures. The use of various piezoelectric elements and suggestions for transducer geometries are also described by Powers, IEEE Electronics and Aerospace Convention 1979 Part III, and by Pantellis, Physics in Technology 15(5) Sept. 1984 pp. 239-243 and 261, and American Chemical Society Symposium Series 1984 pp. 399 et seq. However, it has been appreciated that considerable improvements in the sensitivity of such piezoelectric devices are necessary in order for effective transducers to be formed.

The signals produced by a piezoelectric material depend inter alia on the direction in which the strain is applied, as is made clear for example by Klaase and Van Turnhout IEE Conf Publ No. 177, 1979 and Nix, Holt, McGrath and Ward, Ferroelectrics 1981 vol 32 p.p. 103-114. Where the material has been oriented by stretching and polarized by application of a high electric field perpendicular to the direction of orientation, the $d_{31}$ response of the material is the charge generated in the direction of poling by stress applied in the orientation direction, the $d_{33}$ response is the charge generated by stress applied in the poling direction, and the $d_{32}$ response is the charge generated by stress applied in a direction perpendicular to both the directions of orientation and poling. Typically the $d_{31}$ response of polyvinylidine fluoride is large, the $d_{33}$ is larger still (about 50% larger than $d_{31}$) and of opposite sign and the $d_{32}$ is small and of the same sign as $d_{31}$. The signal obtained when a material is subjected to a hydrostatic stress in which pressure is applied equally in all directions, usually referred to as $d_3$, is simply the sum of the $d_{31}$, $d_{32}$ and $d_{33}$ responses and will usually be relatively small, typically about 10 $pCN^{-1}$, since the $d_{31}$ response will counteract much of the $d_{33}$ response, and will be of the same sign as the $d_{33}$ response since the $d_{33}$ response is the largest component. Considerable work has been conducted to improve the response of piezoelectric materials, for example as described in the Nix et al paper mentioned above, and the sensitivity of the materials is usually defined in terms of the hydrostatic piezoelectric coefficient $d_{3h}$, an improvement in which implies that $d_{33}$ increases at a greater rate than $d_{31}$ (or $d_{32}$). In the case of coaxial cables, in which the piezoelectric material has been stretched axially and poled radially, the provision of a central metal conductor will improve the $d_{3h}$ coefficient of the cable further in the majority of cases since it will usually suppress axial elongation and contraction of the cable and thereby reduce the $d_{31}$ contribution to the $d_{3h}$ coefficient.

The present invention is concerned with a support for a piezoelectric pressure sensor which can be used to form a piezoelectric transducer having an improved sensitivity. According to the present invention, there is provided a support for supporting an elongate piezoelectric pressure sensor, which comprises a generally cylindrical hollow support member of wall thickness T, and mean radius R, and a potting material located in the interior of the support member, the support member having a tensile modulus of elasticity E (at least in the circumferential direction) and the potting material having a bulk modulus of elasticity $K_p$ such that $$2K_p + \frac{E \cdot T}{R} \leq 10 \ GPa$$

but such that $$\frac{E \cdot T}{K_p \cdot R} \geq 0.02,$$

the support member having at least one helical depression on its external surface that extends along the member.

A piezoelectric pressure transducer may be formed in a simple manner by winding one or more elongate pressure sensing elements helically around the support so that the or each pressure sensing element lies in a helical depression in the support member, and connecting the or each pressure sensing element to an electrical terminal for receiving electrical signals.

The present invention is based on our observation that the sensitivity of such a transducer may be significantly improved while maintaining other desirable properties of the transducer such as its flexibility, by arranging the elements of the transducer, and particularly the sensor support, so that the signals generated by the pressure sensing element or elements have a $d_{31}$ polarity rather than a $d_{33}$ polarity.

By the term "$d_{31}$ polarity" as used herein is meant that the signals generated by the cable have the sign characteristic of $d_{31}$ signals, i.e. of those produced by stress applied in the "1" (stretching) direction. This does not mean that the signals produced are pure $d_{31}$ signals, since the transducer signal will normally contain $d_{32}$ and $d_{33}$ components in addition, but that the $d_{31}$ signal is enhanced and/or the $d_{32}$ signals are reduced by the transducer according to the invention to give a signal of $d_{31}$ polarity. In the field of transducer design it is often more usual to refer to the voltage piezoelectric coefficient, $g_{31}$, $g_{32}$, $g_{33}$ and $g_{3h}$. However, since the voltage piezoelectric coefficient $g_{3i}$ will be proportional to the charge piezoelectric coefficient $d_{3i}$, the polarity of the signals produced will be the same whether expressed in terms of a charge or a voltage coefficient.

In order for an elongate pressure sensing element to exhibit an improved acoustic response it has been found that the support member preferably has an effective radial rigidity (defined as $2K_p + (E.T/R)$) not more than 6, more preferably not more than 4, especially not more than 3 and most especially not more than 2 GPa. Examples of materials which can be used to form the potting material include elastomers, especially polyurethane elastomers, silicone elastomers, polysulphides or natural rubber. Alternatively the potting material may comprise a liquid e.g. water, kerosene or a silicone fluid which is held in a flexible bag. It is also possible for the potting material to comprise a gel, for example a gel comprising a crosslinked elastomeric network (e.g. an organopolysiloxane or a polyurethane or a fluorisilicone) which has been extended to a high degree e.g. 70% or more of the gel, with a liquid e.g. a liquid organopolysiloxane. Such gels generally exhibit liquid like flow properties combined with high cohesive strength. In some instances it is possible for the potting material and the support member to be formed from the same material, for example some forms of potting material may be crosslinked at their outer surface by irradiation or chemical crosslinking means to form an outer layer or skin of relatively high tensile modulus which forms the support member. In some instances it may be desirable for the rigidity of the support member to be even lower, in which case it is possible to reduce the bulk modulus component of the support member rigidity yet further by foaming the potting material e.g. by incorporating a blowing agent therein, or by incorporating a foamed material in the potting material e.g. foamed high or low density polyethylene (preferably a closed cell foam) or expanded polystyrene. By the use of a foamed or expanded material, the radial rigidity of the support member may be reduced to values below 1 or even 0.5 GPa or lower. We have found that the use of the potting material not only can improve the sensitivity of the hydrophone but also can reduce the depth sensitivity of the hydrophone, that is to say, reduce the change in the response of the hydrophone as the hydrostatic pressure increases. Preferably the bulk modulus of the potting material is not more than 5, more preferably not more than 3, especially not more than 2, and most especially not more than 1.2 GPa. Where the potting material is foamed, or where foamed or expanded materials are incorporated therein, the bulk modulus may be reduced to 0.5 GPa or less. The bulk modulus of the potting material may be determined by the method described by B.P. Holownia in J. Inst. Rubber Industry August, 1974, 157–160. This method is not readily applicable to the measurement of the bulk modulus of foamed materials, in which case the modulus of the material may be obtained from the equation:

$$B^{-1} = Bo^{-1}(1 - kf)^{-1} + \frac{3kf}{4\mu(1 - kf)}$$

where: B is the bulk modulus of the foamed material;
Bo is the bulk modulus of the unvoided material;
$\mu$ is the shear modulus of the unvoided material;
f is the fractional volume of the potting material occupied by voids; and
k is a packing fraction coefficient (taken to be 0.74).

This equation can be shown to correspond to the equation:

$$B^{-1} = Bo^{-1}(1 - kf)^{-1} + \frac{(1 + \nu)kf}{2Bo(1 - kf)(1 - 2\nu)}$$

where $\mu$ is Poisson's ratio.

The bulk modulus of a filled material can be obtained from the following equation:

$$B = \frac{2E(1 - kf)}{3[(1 - 2\nu) + (1 + \nu)kf - C]}$$

where

-continued $$C = \frac{27(1 - \nu)^2 kfBf}{(1 - kf)2E(1 - kf) + 3Bf[(1 + \nu) + (1 - 2\nu)kf]}$$

where B, k, $\mu$ and f are defined as above, and
E is the Young's modulus of the potting material; and
$Bf$ is the bulk modulus of the filler.

For highly foamed fillers, e.g. with greater than 75% voiding, the bulk modulus of the filler may be given by:

$$Bf = \frac{Ef(1 - f)^{\frac{5}{3}}}{3} + f\gamma P$$

in which Ef is the Young's modulus of the filler material
$\gamma$ is the specific heat capacity ratio for the voiding gas (about 1.4); and P is the hydrostatic pressure.

A large variation in the modulus with respect to frequency and/or temperature is often found when the temperature of the material is close to the glass transition temperature of the material and it is therefore preferred for the material to have a glass transition temperature (at 100 $H_z$ and preferably also at 2 $KH_2$) that differs from the normal operating temperature of the transducer (about 0° to +15° C.) by at least 10° C., more preferably at least 15° C. and especially at least 20° C., the glass transition temperature preferably being below the normal operating temperature of the transducer.

In addition to providing a means of supporting and locating an elongate pressure sensing element, the support member preferably also acts as a barrier that is able to suppress transmission of external pressure variations to the potting material within the support member that is to say, so that the amplitude of the pressure variations is smaller in the potting material than outside the support member. This may be achieved, for example, if the ratio $E.T/K_p.R$ is at least 0.02. Preferably the ratio $E.T/K_p.R$ is at least 0.03, although where potting materials of lower bulk modulus are used, e.g. foamed materials, the ratio may be as high as 1 or even higher. The thickness of the support member will normally be at least 0.005, preferably at least 0.01 and especially at least 0.02 times its radius, but normally not more than 0.2, preferably not more than 0.1 times its radius, in which case the material forming the support member preferably has a tensile modulus of at least 0.2, more preferably at least 0.5, especially at least 1.0 and most especially at least 1.5 times the bulk modulus of the potting materials, although it may have a tensile modulus that is more than twice or even four times the bulk modulus of the potting material where foamed or expanded potting materials are used.

At least for some forms of transducer, the product of the tensile (Young's) modulus of elasticity E (at least in the circumferential direction) of the support member and the wall thickness T thereof is desirably not more than 6, preferably not more than 4, more preferably not more than 3 and especially not more than 2 MPa.m, so that the support member itself is not so stiff in the radial direction that it will suppress $d_{31}$ signals and enhance $d_{33}$ signals of the pressure sensing element. Thus, according to another aspect, the invention provides a support for supporting an elongate piezoelectric pressure sensor, which comprises a generally cylindrical hollow support member of wall thickness T, and a potting material located in the interior of the support member, the potting material preferably having a bulk modulus of elasticity of not more than 5 GPa, and the support member having a tensile modulus of elasticity E (at least in the circumferential direction) such that the product E.T is less than 6 MPa.m, the support member having at least one helical depression on its external surface that extends along the member.

The particular values for the product E.T will depend at least to some extent on the nature of the pressure sensing element, so that for some piezoelectric elements formed from materials of relatively low tensile modulus the E.T product may advantageously be lower still, e.g. below 1 MPa.m, while in other instances the product could be even larger than 6 MPa.m. The support member is preferably formed from a material having a tensile modulus of at least 0.1 GPa, more preferably at least 0.2 GPa and especially at least 0.5 GPa. Preferred materials from which the support member may be formed include thermoplastics e.g. polyvinylidine fluoride, poly(ethylene-tetrafluoroethylene), and polyolefins e.g. high density polyethylene or polypropylene, polyamides e.g. nylon 6, nylon 6,6, nylon 6,10 or nylon 11, and engineering plastics e.g. polyetherketones, polyether ether ketones or polyether sulphones. Alternatively, blends of thermoplastics and elastomers, and segmented block copolymers may be used. The support member may be formed in a number of ways, for example by moulding, e.g. by blow moulding, or by injection forming, or by recovering a dimensionally recoverable tube onto an appropriately shaped mandrel. If desired, the support member may be formed from a metal, for example a metal e.g. copper or aluminium may be plated or electroformed onto a potting material.

As stated above, the support according to the invention may be used to form a transducer by winding one or more elongate pressure sensing elements helically around the support so that each pressure sensing element lies in a helical depression in the support member. The piezoelectric pressure sensing element may have any of a number of configurations, for example it may be in the form of a strip having a rectangular, e.g. square, cross-section, and have a pair of electrodes on opposed faces of the strip, the electrodes having been formed for example by painting, spraying, electrodeposition, or vacuum deposition. Preferably the elongate pressure sensing element is in the form of a coaxial cable having a central and an outer conductor separated by a piezoelectric dielectric that has been radially polarized. Preferably also, the cable is one in which the central conductor has an axial modulus that is less than that of the polymeric dielectric, so that the $d_{31\,1}$ response of the coaxial cable is not suppressed. Examples of coaxial cables that are particularly suitable for use in the present invention are given in U.S. Pat. No. 4,629,925, issued Dec. 16, 1986, the disclosure of which is incorporated herein by reference.

The support according to the invention is especially suitable for use with piezoelectric pressure sensing elements that employ polymeric piezoelectric materials. The piezoelectric material may, for example, be formed from nylon 5, nylon 7 or other odd numbered nylons, polyhydroxybutyrate, vinylidine cyanide/vinyl acetate copolymers and vinylidine fluoride polymers. The preferred polymers are the vinylidine fluoride polymers, e.g. copolymers of vinylidine fluoride with vinyl fluoride, trifluoroethylene, tetrafluoroethylene, vinyl chloride and chlorotrifluoroethylene, or polyvinylidine fluoride.

The support may have only a single depression that extends helically along it, in which case only a single pressure sensing element will be wrapped around the sensor support. However the transducer need not comprise only a single helix of coaxial cable, but may include two or more helices that may be spaced apart from one another or may be combined to form e.g. two start helix. For example, a particularly preferred form of transducer includes a pair of pressure sensing elements especially in the form of coaxial cables which have been oppositely polarised, the sensing elements being connected to, or having terminals for connection to, a responsive electrical device such as a differential amplifier, so that the piezoelectric responses of the two sensing elements are added but that any responses of the cables to other stimuli are at least partly cancelled.

The sensing element may be bonded to the support member by a potting material, in which case the sensing element may be completely encapsulated within a relatively thick layer of the potting material or the potting material may be located only between the sensing element and the support member. Alternatively, the sensing element may be bonded to the support member by means of a flexible adhesive or potting material and the sensing element may be enclosed in a further flexible potting material which may exhibit high or low damping characteristics.

In many cases it may be desirable to enclose the support and piezoelectric pressure sensor within a flexible tube. In this case it is advantageous to recover a dimensionally recoverable tube, preferably a dimensionally heat-recoverable tube, about the support and pressure sensor. Examples of heat-recoverable articles are given in U.S. Pat. Nos. 2,027,962, 3,086,242 and 3,597,372, the disclosures of which are incorporated herein by reference. Polymers which may be used to form the heat-shrinkable tube include polyolefins such as polyethylene and ethylene copolymers for example with propylene, butene, vinyl acetate or ethyl acrylate, polyamides, polyurethanes, polyvinyl chloride, polyvinylidine fluoride, or other suitable elastomeric materials.

Care should be taken, however, to ensure that the heat used for recovering the tube about the pressure sensor does not adversely affect the piezoelectric properties of the sensor, and for this reason, if a polymeric piezoelectric cable is used, polymeric materials having a relatively low recovery temperature are preferred e.g. a recovery temperature of not more than 130° C. and especially not more than 100° C. Examples of preferred materials include ethylene/vinyl acetate and ethylene/ethyl acrylate copolymers. It is also possible to use dimensionally recoverable materials that recover other than by heat treatment for the tube. Thus, for example the tube may be formed from a solvent-shrinkable material and may be recovered about the helix by application of the appropriate solvent or from a solvent swellable material that is recovered by evaporation of the solvent. The tube will usually have a wall thickness in the range of from 0.1 to 1mm.

If desired, the sensor may be provided with one or more axially extending strength members, for example to reduce the sensitivity of the transducer to any acceleration or vibration in the axial direction. For example, depending on the potting material used, a strength member may be located in the potting material coaxially with the support member. Alternatively, a number of axial strength members may be located at or near the periphery of the potting material, or may be bonded to, or even embedded within, the material forming the support member.

A support according to the invention and a transducer employing such a support will now be described by way of example with reference to the accompanying drawings, in which:

FIG. 1 is a schematic sectional elevation along the axis of a support according to the invention;

FIG. 2 is a schematic sectional elevation along the axis of a transducer employing the support of FIG. 1; and FIG. 3 is a schematic sectional elevation along the axis of a second form of transducer employing the support of FIG. 1.

Referring to FIG. 1 of the accompanying drawings, a support for supporting a piezoelectric coaxial cable comprises a generally cylindrical support member 1 formed from polyvinylidine fluoride (E - 2 GPa), having a wall thickness of about 0.5 mm, a diameter of about 15 mm and a length of about 230 mm. The support member is formed, for example by blow moulding or by recovering a heat-shrinkable tube about an appropriately shaped mandrel, so that is has a helical depression along 2 that extends along its length, adjacent windings of the helical depression being separated by about 6 mm. The interior of the support member is filled, except for the end regions of the support member, with a silicone potting material 3 having a bulk modulus of elasticity of about 1 GPa and a tensile modulus of about 1 MPa. In addition, a number of axial strength members 4 are located in the potting material 3 adjacent to the support member wall.

FIG. 2 shows a transducer which employs the support member shown in FIG. 1. The potting material in the support member is not shown for the sake of clarity. The transducer is formed by winding a length of piezoelectric coaxial cable 5 around the support member 1 and terminating one end 7 of the coaxial cable to wires 16 and 17 at connector 6. The other end 8 of the coaxial cable is provided with an electrically insulating terminating cap 9. A pair of epoxy end caps 10 are then formed in situ in which the ends of the strength members 4 are anchored. Before or after the end caps 10 have been formed, a further quantity of potting material is introduced into each end of the support member 1 in order to fill any voids that were initially present at the ends, and to encapsulate the connector 6.

The external surface of the support may then be provided with a layer of potting material 11 that encapsulates the coaxial cable 5 or, as shown in figure 3, a heat-shrinkable tube 12 may be recovered about the support and coaxial cable.

The coaxial cable 1 is formed by co-extruding a polyvinylidine fluoride dielectric layer 15 and a low melting point metal central conductor 16 to form a wire, heating the wire, stretching the wire to a draw ratio of 3.5 to 4.5 to orient the polyvinylidine fluoride and simultaneously poling the polyvinylidine fluoride by means of a corona discharge, and then depositing a metal outer electrode and optionally providing the cable with a polymeric jacket, this procedure being described in U.S. Pat. No. 4,629,925, identified above In use, when the transducer is submerged in water, acoustic vibrations will cause the support member 1 and the helix of coaxial cable 5 to expand and contract radially, thereby stressing the coaxial cable along its axis. However, because the pressure vibrations act radially on the cable to a much lesser extent than their axial effect, by virtue of the properties of the sensor support, the signal generated by the cable has a polarity corresponding to a $d_{31}$ mode.

The following Examples illustrate the invention:

EXAMPLE 1

An acoustic hydrophone of the type shown in figure 2 was formed using a 1.6 mm diameter piezoelectric cable as described in U.S. Pat. No. 4,629,925, and a support comprising a 0.5 mm thick tube of polyvinylidine fluoride as the support member, and a cured silicone potting material based on a vinyl terminated silicone polymer of peak molecular weight about 25,000 and containing about 45% silica based filler. The coaxial cable helix had a 10 mm diameter and the transducer had an overall length of 230 mm.

The hydrophone sensitivity was tested in a water tank at frequencies between 600 Hz and 2 kHz. The results are shown in Table I.

TABLE I

| Frequency (kHz) | Sensitivity (dB re 1 V per micropascal) |
| --- | --- |
| 0.6 | −194.8 |
| 0.8 | −194.5 |
| 1.0 | −194.9 |
| 1.2 | −194.5 |
| 1.4 | −194.7 |
| 1.6 | −194.3 |
| 1.8 | −194.2 |
| 2.0 | −193.6 |

The hydrophone was also tested in a piston phone acoustic calibrator at frequencies between 20 and 160 Hz. The results show a good correlation with the tank measurements and are shown in Table II.

TABLE II

| Frequency Hz | Sensitivity (dB re 1 V per micropascal) |
| --- | --- |
| 20 | −194.3 |
| 40 | −194.2 |
| 60 | −194.3 |
| 80 | −194.3 |
| 100 | −194.1 |
| 120 | −194.2 |
| 140 | −194.2 |
| 160 | −193.7 |

It was found that the sensitivity of the device was about 12 dB higher than that of the freely suspended coaxial cable on its own working in the $d_{3h}$ mode.

EXAMPLE 2

An acoustic hydrophone as shown in FIG. 3 was formed using a 1.6 mm diameter piezoelectric cable as described in British Patent Application No. 2,150,345A, a 15 mm diameter tube of polyvinylidine fluoride of wall thickness 0.5 mm as the support member and the same silicon rubber potting material as was used in Example 1. The sensitivity was tested in a water tank at frequencies between 600 Hz and 2.0 kHz and the results are shown in Table III.

TABLE III

| Frequency kHz | Sensitivity (dB re 1 V per micropascal) |
| --- | --- |
| 0.6 | −190.5 |
| 0.8 | −190.4 |

TABLE III-continued

| Frequency kHz | Sensitivity (dB re 1 V per microparcal) |
|---|---|
| 1.0 | −190.6 |
| 1.2 | −190.2 |
| 1.4 | −190.2 |
| 1.6 | −190.2 |
| 1.8 | −190.2 |
| 2.0 | −190.2 |

EXAMPLE 3

Example 2 was repeated with the exception that the silicone potting material in the central region contained approximately 40% by volume of expanded polystyrene chips in order to reduce the bulk modulus of the potting material. The sensitivity of the transducer was tested in a water tank at frequencies between 400 Hz and 2 kHz, and the results are shown in Table IV.

TABLE IV

| Frequency kHz | Sensitivity (dB re 1 V per micropascal) |
|---|---|
| 0.4 | −187.3 |
| 0.6 | −187.4 |
| 0.8 | −187.2 |
| 1.0 | −186.6 |
| 1.2 | −186.4 |
| 1.4 | −186.6 |
| 1.6 | −186.6 |
| 1.8 | −186.2 |
| 2.0 | −186.3 |

EXAMPLES 4 to 11

Example 1 was repeated using a support member that had been formed from polyvinylidine fluoride by a vacuum forming process, and had a minimum diameter of 11.5mm and a maximum wall thickness of 0.36mm. In Example 11 a low density polyethylene support member formed by vacuum forming was used. The maximum wall thickness was 0.35mm. The following potting materials were used:

| Example | Potting Material |
|---|---|
| 4 | polyurethane based on diphenylmethane 4,4'-diisocyanate and glycerol initiated polypropylene glycol (molecular weight about 3000) and containing about 23% calcium carbonate filler. |
| 5 | As Example 4 but foamed by agitating in air to reduce the density to 0.975 gcm$^{-3}$. |
| 6 | As Example 1. |
| 7 | polyurethane based on isocyanate terminated polytetrahydrofuran based urethane prepolymer of peak molecular weight about 12000 and a mixture of 4,4'-diaminophenylmethane and isomers in dioctyl phthalate. |
| 8 | As Example 1 but including a large proportion of expanded polystyrene bead (1–2 mm diameter). |
| 9 | Polysulphide based on polysulphide having terminal thiol groups (molecular) weight about 1000), phthalate based plasticiser, titanium dioxide and calcium carbonate fillers, and manganese dioxide curing agent in phthalate based plasticiser. |
| 10 (comparison) | Room temperature polyamide cured two-part epoxy. |

The potting materials and the potted support members had the properties shown in Table V and the properties of the hydrophones are shown in Table VI.

TABLE V

| Example | Potting Material | Void Content (%) | Bulk Modulus (2) Kp (MPa) | Glass Transition Temperature (°C.) @ 100 Hz | 2 Kp + ET/R (1) (GPa) | ET/KpR (1) |
|---|---|---|---|---|---|---|
| 4 | polyurethane | 5.5 | 23.45 | −27 | 0.073 | 1.113 |
| 5 | foamed polyurethane | 8.6 | 14.65 | −25 | 0.0554 | 1.78 |
| 6 | silicone | 6.4 | 14.45 | −45 | 0.055 | 1.81 |
| 7 | polyurethane | 5.7 | 111.9 | −34 to −5 | 0.250 | 0.23 |
| 8 | silicone + polystyrene | — | — | — | — | — |
| 9 | polysulphide | 4.1 | 15.16 | −23 | 0.056 | 1.72 |
| 10 | epoxy | 10.1 | 1480 | +45 | 2.99 | 0.0176 |

Notes
(1) Circumferential Young's modulus of the support member (E) was 480 MPa
(2) Nodulus values were determined at 1 Hz and 20° C.

TABLE VI

| Example | Potting Material | Sensitivity dB/V/uPa | Standard Deviation | Frequency Response (dB/octave) | Pressure Response (dB/bar) |
|---|---|---|---|---|---|
| 4 | polyurethane | −195 | 0.56 | 0.16 | 0.73 |
| 5 | foamed polyurethane | −186.2 | 0.12 | 0.03 | 0.18 |
| 6 | silicone | −187.5 | 0.27 | 0.1 | 1.8 |
| 7 | polyurethane | −194.4 | 0.54 | 0.37 | 0.4 |
| 8 | silicone + polystyrene | −184.6 | 0.11 | 0.08 | 0.16 |
| 9 | polysulphide | −186.8 | 0.27 | 0.2 | 0.24 |
| 10 (comparison) | epoxy | −214.0 (1) | 0.81 | 1.02 | 0.64 |

Note: (1) measured at 30 Hz.

From the table it can be seen that the hydrophones in which the potting material had been foamed or had had foamed materials incorporated therein exhibited the greatest sensitivity, the lowest frequency response and the lowest pressure sensitivity. The greatest frequency response was shown by Example 7 which is believed to be due to the relatively high glass transition temperature of the potting material at frequencies of 100 Hz and above.

We claim:

1. A support for supporting an elongate piezoelectric pressure sensor, which comprises a generally cylindrical hollow support member of wall thickness T, and mean radius R, and a potting material located in the interior of the support member, the support member having a tensile modulus of elasticity E (at least in the circumferential direction) and the potting material having a bulk modulus of elasticity $K_p$ such that $$2K_p + \frac{E \cdot T}{R} \leq 10 \, GPa$$

but such that $$\frac{E \cdot T}{K_p \cdot R} \geq 0.02,$$

the support member having at least one helical depression on its external surface that extends along the member.

2. A support for supporting an elongate cylindrical piezoelectric pressure sensor, which comprises a generally cylindrical hollow support member of wall thickness T, and a potting material located in the interior of the support member, the potting material having a bulk modulus of elasticity of not more than 5 GPa, and the support member having a tensile modulus of elasticity E (at least in the circumferential direction) such that the product E.T is less than 6 MPa.m, the support member having at least one helical depression on its external surface that extends along the member.

3. A support as claimed in claim 2, wherein the potting material has a bulk modulus of elasticity of not more than 1200 MPa.

4. A support as claimed in claim 1 or claim 2, wherein the product E.T. is not more than 1 MPa.m.

5. A support as claimed in claim 1 or claim 2, wherein the product E.T. is greater than the product of the tensile modulus of the potting material and the radius of the support member.

6. A support as claimed in claim 1 or claim 2, wherein the support member has a wall thickness in the range of from 0.01 to 3 mm.

7. A support as claimed in claim 1 or claim 2, wherein the support member has a diameter in the range of from 5 to 100 mm.

8. A support as claimed in claim 1 or claim 2, wherein the support member has a plurality of helical depressions in its external surface which together define a multi-start helix.

9. A support as claimed in claim 1 or claim 2, wherein the potting material comprises an elastomer.

10. A support as claimed in claim 1 or claim 2, wherein the potting material comprises one material selected from the group consisting of a polyorganosiloxane material, a polyurethane elastomer, a polysulphide elastomer, natural rubber and a gel.

11. A support as claimed in claim 10, wherein the potting material comprises a silicone elastomer or a silicone gel.

12. A supprt as claimed in claim 1 or claim 2, wherein the potting material comprises at least in part a foamed matrial .

13. A support as claimed in claim 1 or claim 2, wherein the potting material has a glass transition temperature (at 100 $H_z$) not higher than $-10°$ C.

14. A support as claimed in claim 1 or claim 2, wherein the support member comprises one material selected from the group consisting of high density polyethylene, polypropylene, polyvinylidine fluoride poly-(ethylene-tetrafluoroethylene), a thermoplastic aromatic polymer and a thermoplastic polyamide.

15. A support as claimed in claim 1 or claim 2, which is provided with an end cap at each end thereof.

16. A support as claimed in claim 1 or claim 2, which includes at least one axial strength member.

* * * * *

UNITED STATES PATENT AND TRADEMARK OFFICE
CERTIFICATE OF CORRECTION

PATENT NO. : 4,809,244

DATED : February 28, 1989

INVENTOR(S) : Richard J. Penneck

It is certified that error appears in the above-identified patent and that said Letters Patent is hereby corrected as shown below:

Column 11, line 18, after "sensor" insert "cable"

Signed and Sealed this

Fifteenth Day of August, 1989

Attest:

DONALD J. QUIGG

Attesting Officer

Commissioner of Patents and Trademarks